Figure 3:
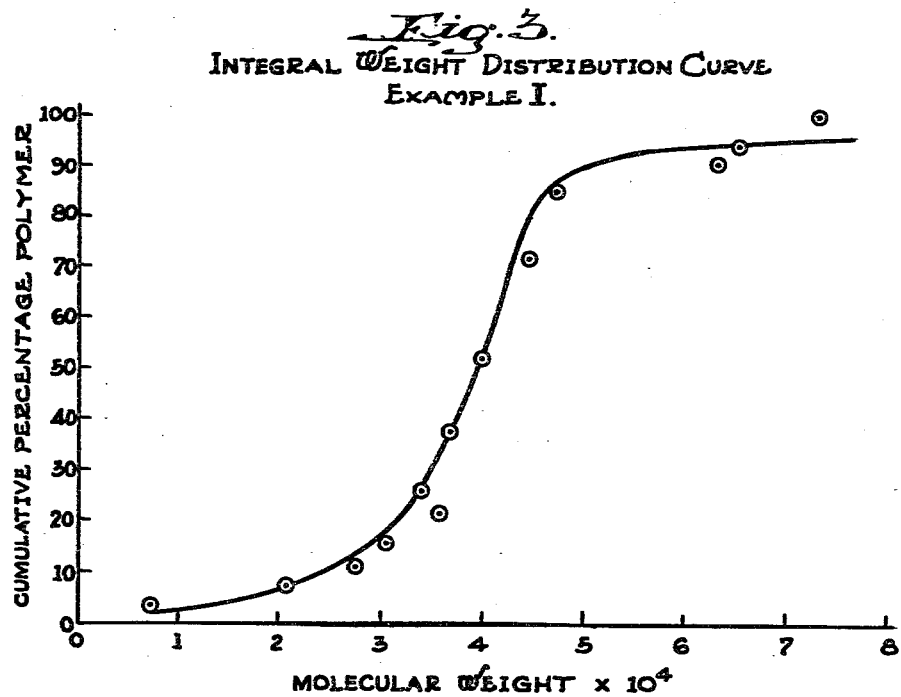

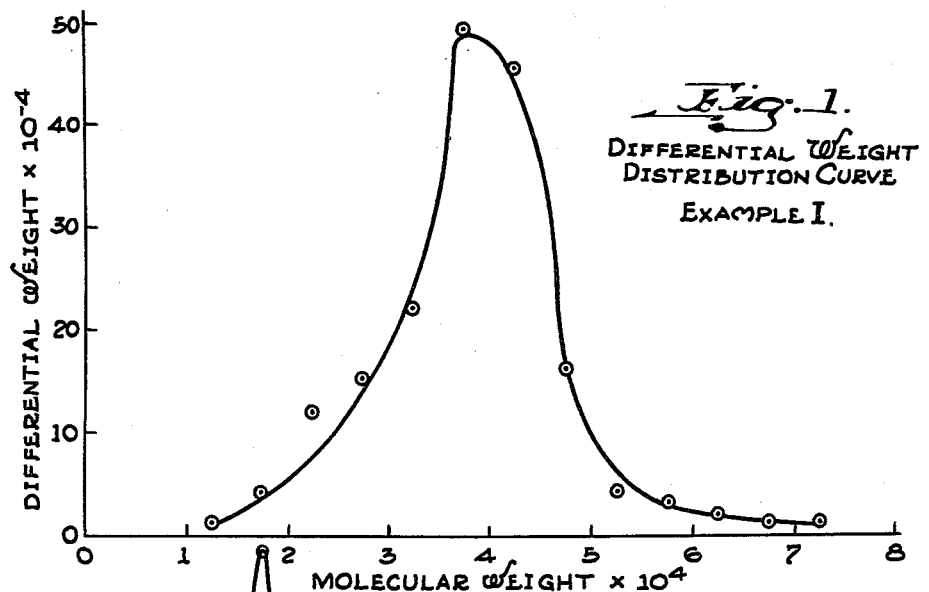
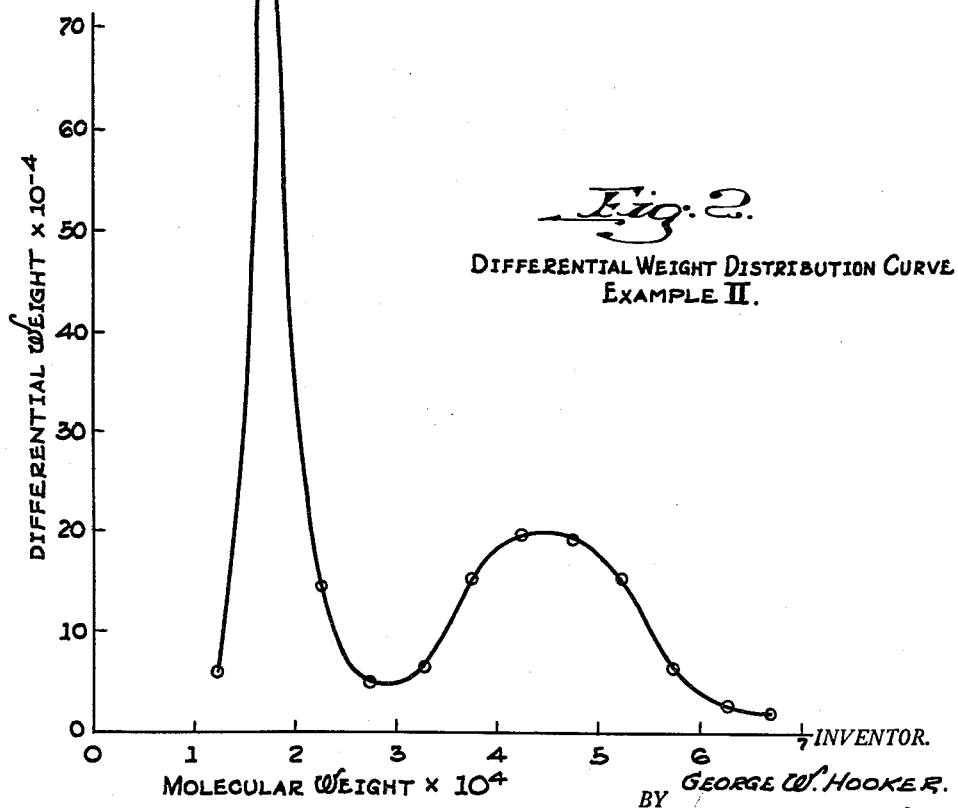

INTEGRAL WEIGHT DISTRIBUTION CURVE
EXAMPLE I.

INTEGRAL WEIGHT DISTRIBUTION CURVE
EXAMPLE II

INVENTOR.
GEORGE W. HOOKER.
BY
his
ATTORNEY

United States Patent Office 3,107,238
Patented Oct. 15, 1963

3,107,238
PROCESS FOR THE POLYMERIZATION OF ETHYLENE
George W. Hooker, New Brighton, Pa., assignor to Koppers Company, Inc., a corporation of Delaware
Filed June 6, 1955, Ser. No. 513,313
11 Claims. (Cl. 260—94.9)

This application is concerned with a process for the polymerization of ethylene. More particularly the application is concerned with a process for the polymerization of ethylene in the presence of a catalyst which is a mixture of (A) and (B) in which (A) has the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, alkyl, halogen atoms, alkyloxy radicals, aryloxy radicals, secondary amino radicals, secondary acid amide radicals, mercapto radicals, thiophenyl radicals, radicals of carboxylic acids and radicals of sulfonic acids, and in which (B) is a compound of a metal selected from the group consisting of metals of group IV–B, V–B, and VI–B of the periodic system including thorium and uranium at temperatures under the decomposition temperature of the particular catalyst, that is in the order of 100° C. and at pressures of less than 100 atmospheres. Suitably these catalysts are slurried or dissolved in an inert solvent such as, for example, heptane, hexane, pentane, cyclohexane, tetrahydronaphthalene, decahydronaphthalene, benzene, xylene, o-dichlorobenzene, chlorinated naphthalene, dibutylether, and the like.

It is known, as taught in Ziegler Belgian Patent 533,-362, issued May 16, 1955, to the polymerize ethylene in the presence of the aforementioned catalysts. Conveniently this is accomplished by preparing a mixture of the catalyst and a liquid inert solvent and introducing ethylene below the liquid level while stirring until a slurry of polyethylene is obtained.

It has now been discovered as a feature of this invention that the molecular weight distribution of polyethylene produced by contacting ethylene with an aforementioned catalyst in an inert solvent can be desirably altered by running the polymerization in a continuous manner as hereinafter described. Thus the present invention broadly embraces a process for the polymerization of ethylene comprising continuously and simultaneously adding to a reaction zone ethylene, a catalyst and an inert solvent in liquid form, withdrawing polymer slurry from said zone and separating the polyethylene therefrom. Advantageously the slurry is withdrawn at such a rate as to maintain the amount of constituents in the reaction zone substantially constant. Advantageously it includes maintaining said reaction zone constituents in the temperature range of from about 50° C. to about 85° C. and in which said catalyst is as aforedescribed.

In another embodiment the invention embraces a process for the polymerization of ethylene comprising continuously and simultaneously adding to a reaction zone ethylene, a solution of catalyst component (A) in an inert solvent and a solution of catalyst component (B) in inert solvent while withdrawing polymer slurry from said zone at a rate to maintain the amount of constituents in said reaction zone substantially constant, and in which the catalyst components (A) and (B) are as aforedescribed.

As mentioned above polymerizing ethylene in accordance with the present invention enables one to obtain polyethylene in which the molecular weight distribution varies only over a limited range as compared to the distribution of molecular weights obtained by operating as heretofore known by a batch procedure. These differences are illustrated by FIGURES 1 and 2 which are the differential weight distribution curves for the polyethylenes of Examples 1 and 2. The slopes $dy/dx$ from the integral distribution curves are plotted against molecular weight. The slopes are obtained from FIGURES 3 and 4 which are the integral distribution curve for polyethylenes produced by Examples 1 and 2. In these FIGURES 3 and 4 the cumulative percent polymer is plotted as the abscissa and molecular weight as the ordinate. It will be noted that the differential weight distribution curve (FIGURE 2) of the polyethylene of Example 2 has two peaks. That is, there are two sizable fractions of the polymer having markedly differing molecular weights. On the other hand the differential weight distribution curve (FIGURE 1) for the polyethylene of Example 1 shows only a single peak. That is, the major fraction of this polyethylene has molecular weights varying within a limited range as compared to the polyethylene of Example 2.

The continuous addition of the various components required for the reaction to a reaction zone can be accomplished in a variety of ways. For example, the catalyst components (A) and (B) can be admixed with the inert solvent and this mixture added to the reaction zone while simultaneously and continuously, ethylene is added and polymer slurry withdrawn. Alternatively there can be prepared separate solutions or mixtures of catalyst components (A) and (B) in the inert solvent and these can be added as separate streams as aforedescribed to the reaction zone. In another variation there can be utilized in place of fresh inert solvent quantities of the liquid residue obtained by separating polyethylene from the polymer slurry. This liquid residue and make-up quantities of inert solvent can be utilized to prepare catalyst mixes which are then introduced to the reaction zone as aforedescribed. Further, this liquid residue can be recycled to the reaction zone while there is added make-up quantities of catalyst and inert solvent mixture or make-up quantities of catalyst components (A) and (B) and inert solvent in separate streams as aforedescribed. The advantages obtained by such recycle procedures are described and claimed in the copending application of John W. Martin, Jr., Serial No. 513,567, filed concurrently herewith (now abandoned).

The desirable results are obtained with any of these variations. It is further to be realized that, while the word "continuously" has been used in describing the manner of addition of the various components, this addition can be accomplished advantageously by incremental additions of the components, such as for example, that which is accompanied by the use of a proportioning pump. Such pump, of course, does not deliver on the intake stroke but adds material to the reaction zone in a substantially continuous, but incremental fashion. This is contemplated by the present invention.

Similarly, while it is desirable to withdraw continuously from the reaction zone the polymer slurry this too can be accomplished in an incremental fashion; that is, for example the liquid level can be allowed to rise during a period when polymer is not being withdrawn. Thereafter polymer slurry can be withdrawn at a rate greater than that at which the catalyst, inert solvent and ethylene are being added to effect a lowering of the liquid level in the reaction zone to a point below the normal liquid level. Preferably, the variations in the liquid level should not effect a change in the volume of reaction zone constituents in excess of about 10 percent from the volume of constituents present when the normal liquid level obtains. In comparison, the continuous and simultaneous introduction of the catalyst, inert solvent and ethylene is of markedly more importance to a realization of the advantages of this invention, than the withdrawal of the polymer slurry.

Thus it will be seen that the present invention provides a means of producing polyethylene having minimum molecular weight distribution.

As used herein the terms "parts" and "percent" mean parts and percent by weight unless otherwise specified.

EXAMPLE 1

To a suitable glass-lined reaction vessel equipped with a stirrer and a reflux condenser there is added a mixture of 1780 parts of dry heptane, 3.42 parts of diethylaluminum chloride and 5.61 parts titanium tetrachloride. Ethylene at the rate of about 50 parts per hour is added below the liquid level while the contents are stirred and in approximately 4½ hours there is obtained a slurry of polyethylene. There is then commenced the simultaneous and continuous addition of the above described catalyst-heptane mixture at the rate of approximately 400 parts per hour and the addition of ethylene at the above rate is continued.

There is also commenced at this time the withdrawal of polymer slurry at the rate of approximately 450 parts per hour. The temperature of the reaction zone is maintained at about 52–53° C.

This run is continued and during the eighth to tenth hours of simultaneous and continuous addition of reactants and withdrawal of slurry of the polyethylene separated from the slurry is sampled and its average molecular weight determined to be 42,000. This sample is representative of the polyethylene produced by the continuous method of operating during the period of simultaneous and continuous addition of catalyst-inert solvent mixture ethylene.

Data for the integral distribution curve (FIGURE 3) for this sample is obtained as follows:

A film is prepared by dipping a foil into a solution of 2 grams polyethylene sample in 100 mm. xylene. The film is allowed to dry. There is prepared a 40/60 volume ratio mixture of toluene and normal butanol which is heated to 100° C. in an oil bath. Then the aluminum foil containing the polyethylene film is placed in a fractionator maintained at 100° C. There is added to the fractionator 100 mm. of the toluene-normal butanol mixture and the system allowed to stand for 15 minutes during which time the fractionator is agitated slightly to give a swirling motion to the liquid contents. The solution is removed from the fractionator and evaporated to dryness and the residue weighed. The procedure is then repeated with the varying volume ratios of toluene and normal butanol listed in Table 1 under the heading "Toluene-n-Butanol, Volume Ratio." There are observed the data set forth in the column headed "Percentage Polymer, Based on Total."

Table 1

| Fraction | Toluene-n-butanol, volume ratio | Percentage polymer based on total | Cumulative percentage polymer | Molecular weight,[1] $M_n$ |
| --- | --- | --- | --- | --- |
| 1 | 40/60 | 4.86 | 4.86 | 7,200 |
| 2 | 50/50 | 2.28 | 7.14 | 20,300 |
| 3 | 55/45 | 3.18 | 10.32 | 27,500 |
| 4 | 60/40 | 5.52 | 15.84 | 30,200 |
| 5 | 63/37 | 5.94 | 21.78 | 35,800 |
| 6 | 66/34 | 5.61 | 27.39 | 34,000 |
| 7 | 69/31 | 10.18 | 37.57 | 36,800 |
| 8 | 72/28 | 14.18 | 51.75 | 39,900 |
| 9 | 75/25 | 18.84 | 70.59 | 44,600 |
| 10 | 78/22 | 14.34 | 84.93 | 47,100 |
| 11 | 81/19 | 5.23 | 90.16 | 63,100 |
| 12 | 88/12 | 3.51 | 93.67 | 65,000 |
| 13 | 100/0 | 6.33 | 100.00 | 73,000 |

[1] $1.141 \times 10^{-3} M_n^{0.65}$.

Molecular weights are observed by determination of the inherent viscosities of the fractions in decalin at 135° C. The concentration is in the order of one-tenth gram per 100 mm. of solution. The data are set forth under the heading "Molecular Weight."

Figure 4:
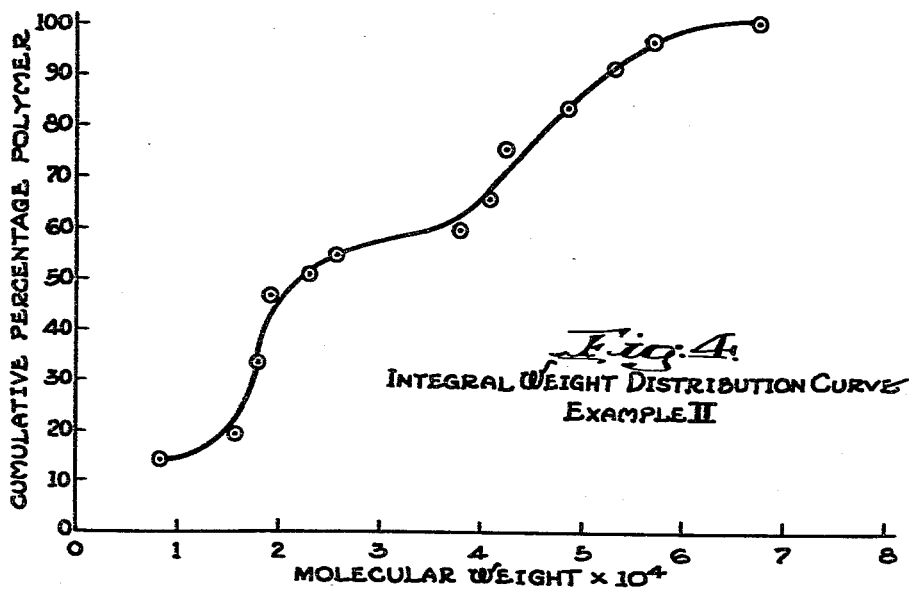

These data are plotted in FIGURE 3.

The slopes $dy/dx$ are obtained by observing $dy$ for selected increments of $dx$ on the curve of FIGURE 3. These data are set forth in Table 2 and are plotted in FIGURE 1.

Table 2

| $y_1$ | $y_2$ | $dy$ | Molecular weight, $x_1-x_2$ | $dx$ | $dy/dx$ |
| --- | --- | --- | --- | --- | --- |
| 2.5 | 3 | 0.5 | 10-15,000 | 5,000 | 1.0 |
| 2.5 | 4.5 | 2.0 | 15-20,000 | 5,000 | 4.0 |
| 5.0 | 10.0 | 6.0 | 20-25,000 | 5,000 | 12.0 |
| 10.0 | 17.5 | 7.5 | 25-30,000 | 5,000 | 15.0 |
| 17.0 | 28.0 | 11.0 | 30-35,000 | 5,000 | 22.0 |
| 26.0 | 50.5 | 24.5 | 35-40,000 | 5,000 | 49.0 |
| 61.0 | 83.5 | 22.5 | 40-45,000 | 5,000 | 45.0 |
| 83.0 | 91.0 | 8.0 | 45-50,000 | 5,000 | 16.0 |
| 90.0 | 92.0 | 2.0 | 50-55,000 | 5,000 | 4.0 |
| 92.0 | 93.5 | 1.5 | 55-60,000 | 5,000 | 3.0 |
| 93.0 | 94.0 | 1.0 | 60-65,000 | 5,000 | 2.0 |
| 94.5 | 95.0 | 0.5 | 65-70,000 | 5,000 | 1.0 |
| 95.0 | 95.5 | 0.5 | 70-75,000 | 5,000 | 1.0 |

EXAMPLE 2

To the reaction vessel of Example 1 there is added 2280 parts of topped heptane, 5.25 parts diethylaluminum chloride and 8.31 parts titanium tetrachloride. The mixture is aged for approximately 1 hour at about 30° C. and there is commenced addition of ethylene at a rate of approximately 100 pounds per hour. The reaction is carried on with stirring for approximately 5⅔ hours at the end of which time the polymer slurry is withdrawn. There is separated therefrom polyethylene of an average molecular weight of 39,000. Analysis of this material as described in Example 1 yields the data for the integral and differential molecular weight distribution curves set forth respectively in Tables 3 and 4 which are plotted as FIGURES 4 and 2 respectively.

Table 3

| Fraction | Toluene-n-butanol, volume ratio | Percentage polymer based on total | Cumulative percentage polymer | Molecular weight,[1] $M_n$ |
| --- | --- | --- | --- | --- |
| 1 | 40/60 | 14.69 | 14.69 | 8,300 |
| 2 | 50/50 | 4.24 | 18.93 | 16,600 |
| 3 | 55/45 | 14.40 | 33.33 | 18,000 |
| 4 | 60/40 | 13.25 | 46.58 | 19,200 |
| 5 | 63/37 | 3.81 | 50.39 | 22,900 |
| 6 | 66/34 | 3.89 | 54.28 | 25,700 |
| 7 | 69/31 | 5.04 | 59.32 | 38,000 |
| 8 | 72/28 | 7.44 | 66.76 | 41,000 |
| 9 | 75/25 | 9.23 | 75.99 | 42,600 |
| 10 | 78/22 | 7.92 | 83.91 | 48,400 |
| 11 | 81/19 | 7.22 | 91.13 | 53,000 |
| 12 | 88/12 | 5.41 | 96.54 | 56,900 |
| 13 | 100/0 | 3.46 | 100.00 | 67,300 |

[1] $1.141 \times 10^{-3} M_n^{0.65}$.

Table 4

| $y_1$ | $y_2$ | $dy$ | Molecular weight $x_1-x_2$ | $dx$ | $dy/dx$ |
| --- | --- | --- | --- | --- | --- |
| 14 | 17.5 | 3 | 10-15,000 | 5,000 | 6.0 |
| 8.0 | 45.0 | 37 | 15-20,000 | 5,000 | 74.0 |
| 48.0 | 55.0 | 7 | 20-25,000 | 5,000 | 14.0 |
| 54.5 | 57.0 | 2.5 | 25-30,000 | 5,000 | 5.0 |
| 56.0 | 59.0 | 3.0 | 30-35,000 | 5,000 | 6.0 |
| 58.5 | 66.0 | 7.5 | 35-40,000 | 5,000 | 15.0 |
| 67.0 | 77.0 | 10.0 | 40-45,000 | 5,000 | 20.0 |
| 77.0 | 86.5 | 9.5 | 45-50,000 | 5,000 | 19.0 |
| 88.0 | 95.5 | 7.5 | 50-55,000 | 5,000 | 15.0 |
| 95.5 | 98.5 | 3.0 | 55-60,000 | 5,000 | 6.0 |
| 98.5 | 100.0 | 1.5 | 60-65,000 | 5,000 | 3.0 |
| 99.5 | 100+ | >1.0 | 65-70,000 | 5,000 | >2.0 |

The various catalysts falling within the general description above can be substituted for the diethylaluminum chloride and titanium tetrachloride mixture utilized in Examples 1 and 2 to obtain results substantially identical thereto. It will be realized that variation of the amount of catalyst or of the molar ratio of catalyst component (A) and catalyst component (B) affects the molecular weight of the polyethylene produced. Preferably these catalysts are utilized in amounts of about 5–15 millimols each constituent per liter solvent. Generally the molar ratios can be varied in the range of 0.5:1 to 12:1. Preferably, for the purposes of the present invention the molar ratios are varied in the range of from about 0.75:1 to 2:1. Further, mixtures of titanium tetrachloride and di-iso-butylaluminum hydride, triethylaluminum, tributylaluminum and trioctylaluminum give superior results. Titanium oxychloride and titanium acetylacetonate, when substituted for titanium tetrachloride give excellent results.

As the inert solvent in the reaction zone is in the liquid form, when utilizing solvents normally gaseous at reaction temperatures such as pentane the system is operated under superatmospheric pressure. It will be realized that variation of the pressure in such instances can affect the boiling point of the inert solvent and thus the maximum temperature at which the system can operate at a given pressure. The advantages of operating the system under conditions at which the inert solvent is at its boiling point are described and claimed in the copending application of George W. Hooker and George O. Napack, Serial No. 513,576, filed concurrently herewith (now abandoned).

There can be substituted for the heptane utilized in Examples 1 and 2 the various inert solvents mentioned above to yield substantially similar results.

While the invention has been described with reference to particular embodiments thereof, it will be understood that in its broadest aspects the invention may be variously embodied within the scope of the invention as set forth herein and in the appended claims.

I claim:

1. In a low pressure, low temperature process for the polymerization of ethylene by contacting ethylene and a catalyst in the presence of an organic solvent at a temperature of from about 50° C. to about 100° C. and at a pressure below 100 atmospheres, in which the catalyst is a mixture of (A) and (B), component (A) being selected from the group consisting of an alkyl aluminum, an alkyl aluminum chloride, and an alkyl aluminum hydride and component (B) being selected from the group consisting of titanium tetrachloride, titanium oxychloride, and titanium acetylacetonate, the molar ratio of component (A) to component (B) being in the range of 0.5:1 to 12:1, the improvement in said low pressure, low temperature polymerization process which comprises continuously and simultaneously adding to a polymerization reaction zone ethylene and a mixture in an organic solvent of said catalyst components (A) and (B) in a molar ratio of from 0.5:1 to 12:1, continuously polymerizing ethylene in said zone at a temperature of from about 50° C. to about 85° C., continuously withdrawing a polymer slurry from said zone at a rate to maintain the quantity of substituents in said reaction zone substantially constant, continuously separating said polymer slurry into a solid polyethylene phase and a liquid residue and returning the liquid residue to the polymerization reaction zone.

2. A process of claim 1 in which the inert hydrocarbon is heptane.

3. A process of claim 1 in which the inert hydrocarbon is hexane.

4. A process of claim 1 in which the inert hydrocarbon is pentane.

5. A process of claim 1 in which the inert hydrocarbon is xylene.

6. A process of claim 1 in which the inert hydrocarbon is propane.

7. A process of claim 1 in which catalyst component (A) is diethylaluminum chloride, and catalyst component (B) is titanium tetrachloride.

8. A process of claim 1 in which catalyst component (A) is triethyl aluminum and component (B) is titanium tetrachloride.

9. A process of claim 1 in which catalyst component (A) is triisobutylaluminum and catalyst component (B) is titanium tetrachloride.

10. A process of claim 1 in which catalyst component (A) is di-iso-butylaluminum hydride and catalyst component (B) is titanium tetrachloride.

11. A continuous low temperature, low pressure process for the production of polyethylene of uniform molecular weight polymers which comprises polymerizing ethylene by continuously introducing ethylene, an organic solvent and a catalyst consisting essentially of a mixture of titanium tetrachloride and diethyl aluminum halide into a reaction zone, the mol ratio of diethyl aluminum halide to titanium tetrachloride being 0.3:1 to 4:1, at a temperature of 50° to 93° C., under about 1 to 6 atmospheres pressure, continuously withdrawing a polymer slurry from the reaction zone, and recovering the aforesaid uniform molecular weight polymers of polyethylene from said slurry.

References Cited in the file of this patent

UNITED STATES PATENTS

| | | |
|---|---|---|
| 2,425,638 | Peterson | Aug. 12, 1947 |
| 2,511,480 | Roedel | June 13, 1950 |
| 2,721,189 | Anderson | Oct. 18, 1955 |

FOREIGN PATENTS

| | | |
|---|---|---|
| 533,362 | Belgium | May 16, 1955 |